United States Patent
Okubo

Patent Number: 5,428,540
Date of Patent: Jun. 27, 1995

[54] ANTI-LOCK CONTROL METHOD AND APPARATUS FOR AUTOMOTIVE VEHICLE

[75] Inventor: Satomi Okubo, Saitama, Japan

[73] Assignees: Akebono Brake Industry, Tokyo; Akebono Research and Development Centre, Ltd., Hanyu, both of Japan

[21] Appl. No.: 99,406

[22] Filed: Jul. 30, 1993

Related U.S. Application Data

[63] Continuation of Ser. No. 633,994, Dec. 26, 1990, abandoned.

[30] Foreign Application Priority Data

Dec. 27, 1989 [JP] Japan ................. 1-336491

[51] Int. Cl.$^6$ .............................. B60T 8/58
[52] U.S. Cl. ................. 364/426.02; 303/96; 303/103
[58] Field of Search ............ 364/426.02, 426.03; 180/197; 303/94–96, 103, 105, 109

[56] References Cited

U.S. PATENT DOCUMENTS

| | | | |
|---|---|---|---|
| 4,902,076 | 2/1990 | Ushijima et al. | 364/426.02 |
| 4,984,164 | 1/1991 | Maehara et al. | 364/426.02 |
| 5,058,019 | 10/1991 | Litkouhi | 364/426.02 |
| 5,065,327 | 11/1991 | Yahagi et al. | 364/426.02 |

FOREIGN PATENT DOCUMENTS

9009301 8/1990 WIPO.

*Primary Examiner*—Vincent N. Trans
*Attorney, Agent, or Firm*—Cushman Darby & Cushman

[57] ABSTRACT

In an anti-lock control arrangement for preventing locking of vehicle wheels, a prescribed speed difference of a threshold speed from an estimated vehicle speed is changed from an initial value of the difference to a larger value when a wheel speed has been lower for a prescribed time than the threshold speed which follows the estimated vehicle speed with the prescribed speed difference therefrom or when a prescribed statement with respect to the wheel speed is repeated at a predetermined number. Further, the speed difference of the threshold speed from the estimated vehicle speed is changed back to the initial value when the wheel speed has become lower than the threshold speed subjected to the former change.

16 Claims, 8 Drawing Sheets

ANTI-LOCK CONTROL METHOD AND APPARATUS FOR AUTOMOTIVE VEHICLE

This is a continuation of application No. 07/633,994, filed on Dec. 26, 1990, which was abandoned.

BACKGROUND OF THE INVENTION

The present invention relates to anti-lock control method and apparatus for preventing the locking of the automotive wheels of a running vehicle during the braking thereof, and more particularly, to an improvement of anti-lock control method and apparatus for preventing braking force applied to inner wheels of the turning vehicle from being insufficient.

In a conventional anti-lock control apparatus for an automotive vehicle, a controller including a microcomputer performs anti-lock control in such a manner that the mode of controlling the brake hydraulic pressure is determined on the basis of an electric signal indicative of the wheel speed detected by a wheel speed sensor. In accordance with the determined mode, a hold valve, which is a normally-open solenoid valve, and a decay valve, which is a normally-closed solenoid valve, are opened or closed to increase, hold or decrease the brake hydraulic pressure of the automotive wheels in order to maintain the steering property and moving stability of the vehicle and shorten the braking distance thereof.

The present inventor once filed a U.S. patent application (Ser. No. 07/403,375) as a related art of the present invention. An anti-lock control method described in the U.S. patent application will be hereinafter described for the purpose of clear understanding of the present invention.

In the anti-lock control method, a reference speed $Vr$ for pressure decrease judgment is set on the basis of the speed (hereinafter referred to as the wheel speed $Vw$) of each wheel controlled by brake control units for the four wheels of a vehicle. Then an estimated vehicle speed is set, which follows the highest wheel speed (four-wheel select-high speed $VwH$) selected among the wheel speeds $Vw$ but the decrease of which, following the four-wheel select-high speed $VwH$, is limited to a prescribed range of speed decrease rate. Finally, a first and a second threshold speed $VT1$ and $VT2$, which follow the estimated vehicle speed $Vv$ with prescribed speed differences therefrom, are set ($Vv > VT1 > VT2$). Statuses of pressure increase, pressure hold and pressure decrease, which are described hereinafter, are set on the basis of the comparison of the wheel speed $Vw$ with the estimated vehicle speed $Vv$ and with the reference speed $Vr$ or the threshold speeds $VT1$ and $VT2$. A hold valve HV and a decay valve DV, which are solenoid valves, are opened or closed in prescribed control manners set for the statuses, to perform the pressure increase, the pressure hold or the pressure decrease.

Figure 7:
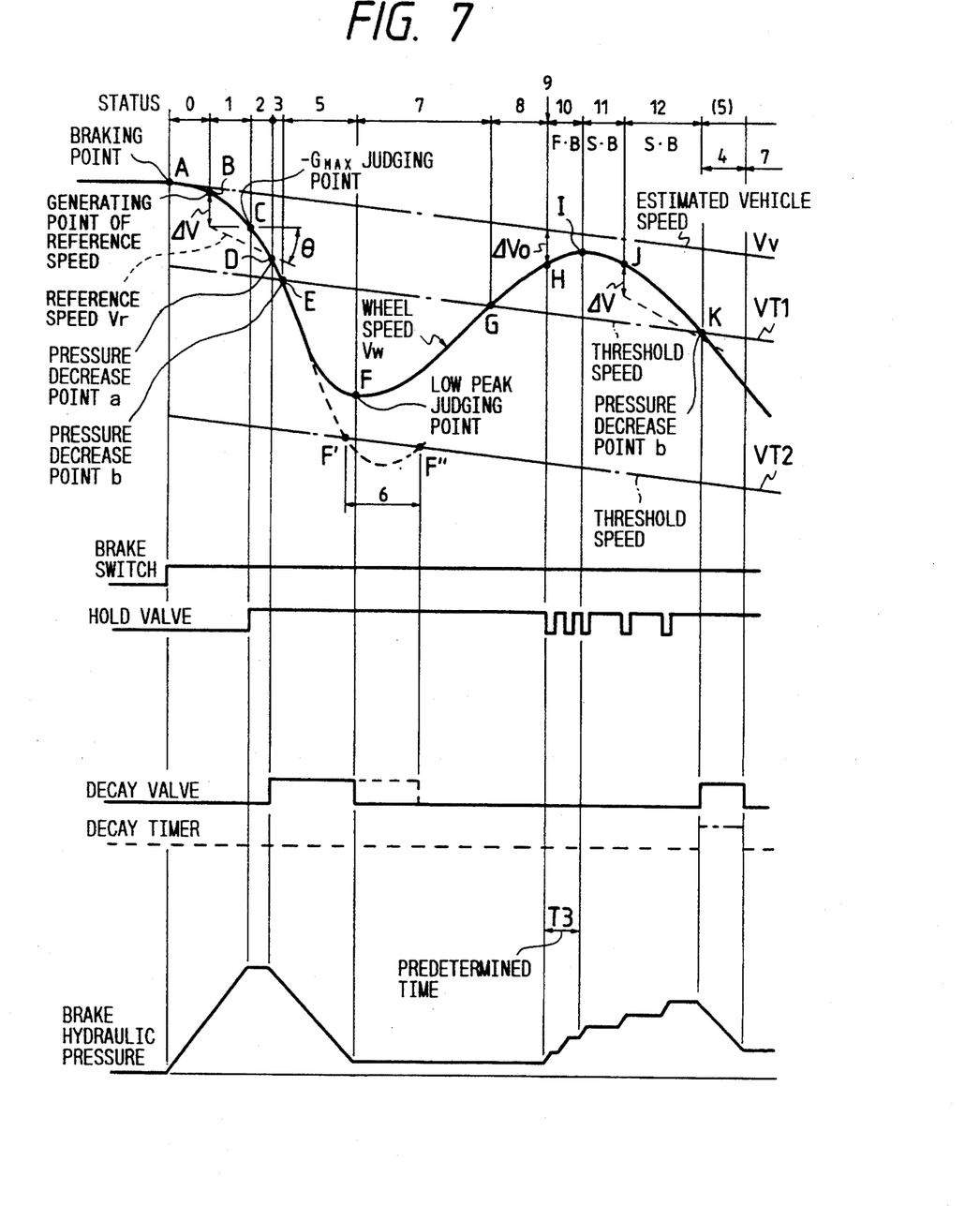
FIGS. 7 and 8 are time charts of an anti-lock control method which is a related art of the present invention.
Figure 8:
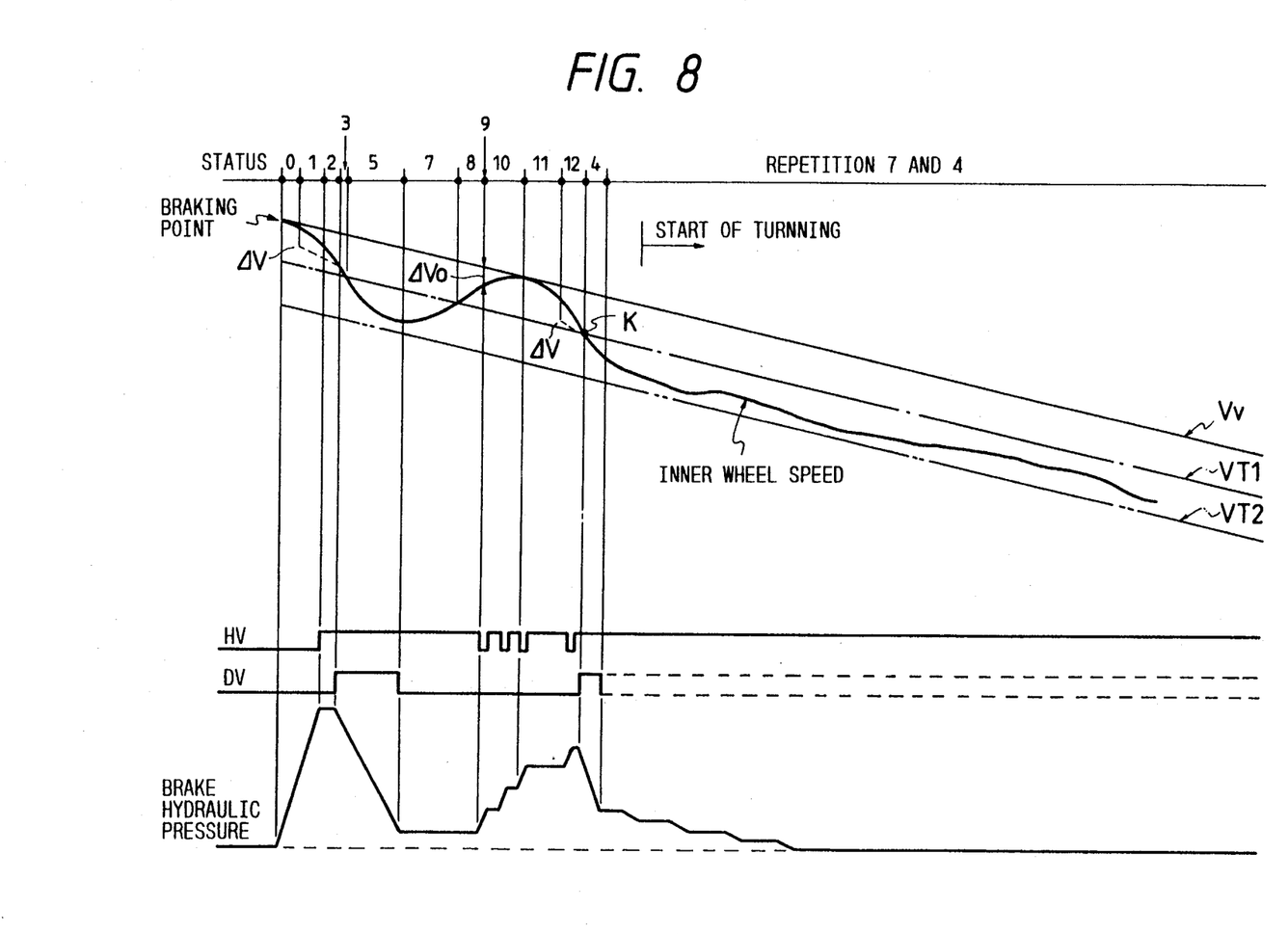

FIG. 7 is a control time chart indicating the changes in the wheel speed $Vw$ and the brake hydraulic pressure $Pw$ and the opening and closing of the hold valve HV and the decay valve DV in the anti-lock control.

The reference speed $Vr$ is set as described hereinafter.

When the brake of the vehicle is not in operation during the movement of the vehicle, the brake hydraulic pressure $Pw$ is not increased, the hold valve HV is open and the decay valve DV is closed. When the brake is put in operation, the brake hydraulic pressure $Pw$ begins to increase at a time point A shown in FIG. 7 and rise sharply (in an ordinary mode) and the vehicle speed $Vw$ is thereby decreased. The reference speed $Vr$ is set so that it follows the wheel speed $Vw$ with a speed difference $\delta V$ therefrom so as to be lower than the wheel speed, and that the reference speed begins to rectilinearly fall with a speed decrease gradient $\theta$ of $-1G$ when the deceleration $dVw/dt$ (negative acceleration) of the wheel speed has reached a prescribed threshold value of $-1G$, for example, at a time point B.

Statuses shown in FIG. 7 are described from now on.

(Status 0)

The status 0 lasts from the time point A at which a brake switch is turned on by depressing a brake pedal, to the time point B at which the rectilinearly falling reference speed $Vr$ is generated because the deceleration $dVw/dt$ of the wheel speed reaches the prescribed value of $-1G$, for example. In the status 0, the hold valve is open, the decay valve is closed, and the brake hydraulic pressure in a wheel cylinder is increased because of the supply of the liquid from a master cylinder.

(Status 1)

The status 1 lasts from the time point B at which the rectilinearly falling reference speed $Vr$ is generated, to a time point C at which the deceleration $dVw/dt$ of the wheel speed is judged to have reached a prescribed value $-Gmax$. In the status 1, the hold valve and the decay valve are not in operation.

(Status 2 (Pressure Hold))

The status 2 lasts from the time point C for the $-Gmax$ judgment, to the earlier one of a time point (pressure decrease time point a) at which the wheel speed $Vw$ becomes lower than the reference speed $Vr$, or a time point (pressure decrease time point b) at which the wheel speed $Vw$ becomes lower than the first threshold speed $VT1$. At the time point C, the hold valve is closed so that the brake hydraulic pressure is maintained. The status 2 terminates at a time point D at which the wheel speed $Vw$ becomes lower than the reference speed $Vr$. However, if the wheel speed $Vw$ becomes lower than the first threshold speed $VT1$ before the time point D, the status 2 terminates when the wheel speed has become lower than the first threshold speed.

(Status 3 (Pressure Decrease))

The status 3 lasts from the time point D at which the wheel speed $Vw$ becomes lower than the reference speed $Vr$, to a time point E at which the wheel speed becomes lower than the first threshold speed $VT1$. At the time point D, the decay valve is opened so that the brake hydraulic pressure begins to decrease.

(Status 4 (Pressure Decrease))

The status 4 is that the anti-lock control is in or beyond the second step, thereof, and the rate $VvG$ of the estimated vehicle speed $Vv$ is smaller than $-0.22\,G$. The status 4 lasts until one of three conditions (1), (2) and (3) mentioned below arises after the wheel speed $Vw$ becomes lower than the first threshold speed $VT1$.

(1) A decay timer put in timing action at the time of the start of the pressure decrease is put out of timing action to prevent the pressure decrease from becoming excessive; done (2) the wheel speed $Vw$ becomes lower than the second threshold speed $VT2$, or (3) the wheel speed Vw is judged to be at a low peak, by detecting that the rates of the decrease and increase in the wheel speed Vw is within a prescribed range from −0.22 G to +0.22 G, for example.

(Status 5 (Pressure Decrease))

The status 5 is that the anti-lock control is in the first step, thereof, or the rate VvG of the decrease in the estimated vehicle speed Vv is larger than −0.22 G. The status 5 lasts from the time point E at which the wheel speed Vw becomes lower than the first threshold speed VT1, to the earlier one of a time point F at which the wheel speed is judged to be at the low peak, or a time point F' at which the wheel speed Vw becomes lower than the second threshold speed VT2 as shown by a dotted line in FIG. 7.

(Status 6 (Pressure Decrease))

The status 6 is that the wheel speed Vw is lower than the second threshold speed VT2. The status 6 lasts from the time point F' to a time point F''.

(Status 7 (Pressure Hold))

The status 7 begins when one of three conditions (1), (2) and (3) mentioned below arises.

(1) The wheel speed Vw is judged to be at the low peak in the statuses 4 and 5;

(2) the decay timer is put out of timing action in the status 4; or (3) the wheel speed Vw becomes higher than the second threshold speed VT2 in the status 6 (at the time point F''').

The status 7 lasts from the above-mentioned beginning to a time point G at which the wheel speed Vw becomes higher than the first threshold speed VT1.

If the wheel speed Vw does not become higher than the first threshold speed VT1 at or after the lapse of a prescribed time T1 in the status 7, the status is replaced by the status 4 so that the pressure decrease is performed again.

(Status 8 (Pressure Hold))

The status 8 lasts from the time point G at which the wheel speed Vw becomes higher than the first threshold speed VT1, to a time point H at which a status 9 exists.

If the wheel speed Vw does not become higher than a speed $Vv-\Delta V_0$ at or after the lapse of a prescribed time $\Delta T8$, in the status 8, the status is replaced by the status 11 so that slow build-up described hereinafter is performed.

(Status 9 (Pressure Increase Start Point))

The status 9 exists at the time point H at which the wheel speed Vw becomes higher than the speed $Vv-\Delta V_0$ which is lower by a prescribed value $\Delta V_0$ than the estimated vehicle speed Vv.

(Status 10 (Fast Build-Up))

The status 10 lasts from the time point H at which the wheel speed Vw becomes higher than the speed $Vv-\Delta V_0$, to a time point I at which a prescribed time T3 has elapsed since the time point H. In the status 10, the hold valve is repeatedly opened and closed so that the brake hydraulic pressure is increased relatively sharply.

(Status 11 (Slow Build-Up))

The status 11 lasts from the time point I at which the fast build-up in the status 10 terminates, to a time point J at which the reference speed Vr is generated. In the status 11, the hold valve is opened and closed longer than opened, so that the brake hydraulic pressure is increased slowly.

(Status 12 (Slow Build-Up))

The status 12 lasts from the time point J at which the reference speed Vr is generated, to the earlier one of a time point at which the wheel speed Vw becomes lower than the reference speed Vr, or a time point at which the wheel speed Vw becomes lower than the first threshold speed VT1. FIG. 7 shows that the status 12 terminates at the time point K at which the wheel speed Vw becomes lower than the first threshold speed VT1. However, if the wheel speed Vw becomes lower than the reference speed Vr before the time point K, the status 12 terminates when the wheel speed has become lower than the reference speed. At the time of the termination of the status 12, the status 4 or 5 arises again.

The anti-lock control method described above has an advantage that the anti-lock control can be appropriately performed to cope with various circumstances. However, the method has a problem which occurs at the time of the braking of the vehicle in the turning thereof, as described heretofore.

Figure 6:
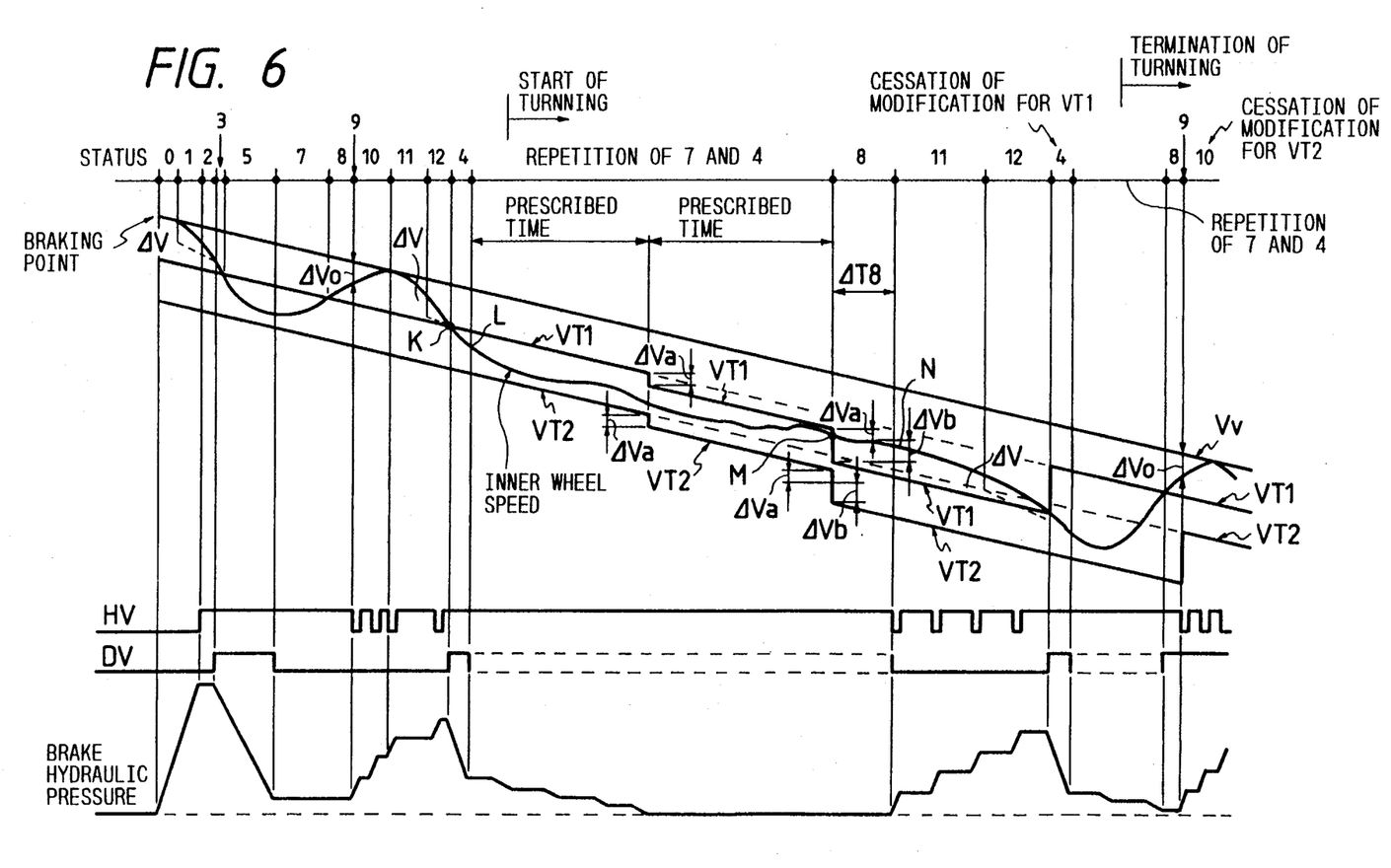
FIG. 6 is a time chart of the control the flow chart of which is shown in FIG. 5.

There is a large speed difference between the inner and outer wheels of the vehicle at the time of the braking thereof in the turning thereof. In the described method, the estimated vehicle speed Vv is set on the basis of the speed of the fastest wheel of the vehicle in a four-wheel highest speed selection procedure as described above, and the two threshold speeds VT1 and VT2 which follow the estimated vehicle speed Vv with the prescribed speed differences therefrom are set (Vv>VT1>VT2). For that reason, the estimated vehicle speed Vv is calculated on the basis of the speed of the outer wheel in the turning of the vehicle. As a result, the two threshold speeds VT1 and VT2 are set to be relatively high speeds as well as the estimated vehicle speed Vv. FIG. 6 is a control time chart indicating the changes in the inner wheel and the brake hydraulic pressure due to the start of the turning of the vehicle during the anti-lock control. Since the speed of the inner wheel is lower than that of the outer wheel in the turning of the vehicle, the speed of the inner wheel becomes lower than the first threshold speed VT1 at the time of the start of the turning of the vehicle, as shown in FIG. 6, thus bringing about the status 4 in which the brake hydraulic pressure begins to decrease. When one of the above-mentioned terminating conditions for the status 4, which is that the decay timer put in timing action at the time of the start of the pressure decrease, becomes put out of timing action, has arisen, the status 4 which is a pressure decrease mode terminates and the status 7 begins. If the speed of the inner wheel does not become higher than the first threshold speed VT1 at or after the lapse of the prescribed time in the status 7, the status 4 arises instead of the status 7 so that the pressure decrease is performed. After the start of the turning of the vehicle in the anti-lock control, the status 4 which is the pressure decrease mode and the status 7 which is a pressure hold mode are thus replaced by each other repeatedly so that the brake hydraulic pressure for the inner wheel is not increased for a while. As a result, the brake hydraulic pressure becomes insufficient to lengthen the braking distance of the vehicle. This is the problem.

SUMMARY OF THE INVENTION

Accordingly, it is an object of the present invention to provide an anti-lock control method in which the braking distance of a vehicle is prevented from being lengthened due to the possible phenomenon that the brake hydraulic pressure becomes insufficient because the speed of the inner wheel of the vehicle is lower than that of the outer wheel thereof at the time of the braking of the vehicle in the turning thereof.

In order to attain the above-noted and other objects, an anti-lock control method provided in accordance with the present invention, comprises the improvement wherein the prescribed speed difference of a threshold speed from an estimated vehicle speed is changed from the initial value of the difference to a larger value when a wheel speed has been lower for a prescribed time than the threshold speed which follows the estimated vehicle speed with the prescribed speed difference therefrom or when a prescribed statement with respect to the wheel speed is repeated at a predetermined number. Further, the speed difference of the threshold speed from the estimated vehicle speed is changed back to the initial value when the wheel speed has become lower than the threshold speed subjected to the former change.

PREFERRED EMBODIMENTS OF THE PRESENT INVENTION

An embodiment of the present invention will be hereinafter described in detail with reference to the drawings attached hereto.

Figure 1:
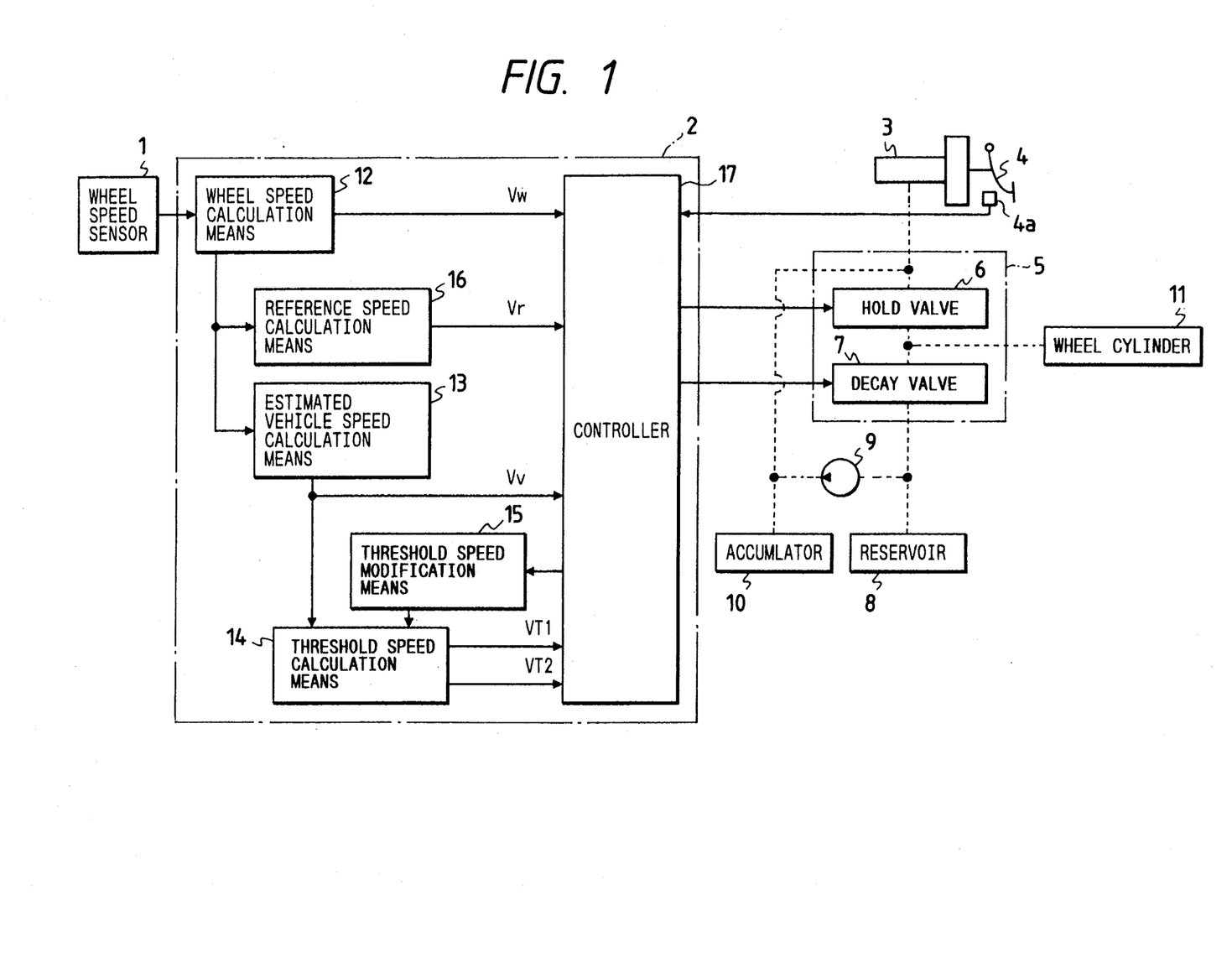
FIG. 1 is a block diagram of a control unit for practicing an anti-lock control method according to an embodiment of the present invention.

FIG. 1 is a block diagram of a control unit for practicing an anti-lock control method according to the embodiment. The control unit shown in FIG. 1 comprises a wheel rotation speed sensor 1 which is one of those attached to the four wheels of a vehicle, a controller 2 made of a computer, a master cylinder 3 which is operated by a brake pedal 4, a modulator 5 including a hold valve 6 which is a normally open solenoid valve and a decay valve 7 which is a normally closed solenoid valve, a reservoir 8 from which a braking liquid is pumped by a pump 9 so as to be stored in an accumulator 10, a brake switch 4a which is turned on by depressing the brake pedal 4, and the wheel cylinder 11 of a brake for the wheel.

The controller 2 includes speed calculation means 12 for calculating the speeds $V_w$ of the wheels from the outputs from the wheel rotation speed sensors 1, estimated vehicle speed calculation means 13 by which the highest one of the four wheel speeds $V_w$ is selected and processed through a filter for acceleration of $+1$ G and deceleration of $-1$ G so that an estimated vehicle speed $V_v$ is obtained, and threshold speed calculation means 14 for calculating a first and a second threshold speeds $VT_1$ and $VT_2$ which follow the estimated vehicle speed $V_v$ with prescribed speed differences therefrom ($V_v > VT_1 > VT_2$). The controller 2 further includes threshold speed modification means 15 by which the first and the second threshold speeds $VT_1$ and $VT_2$ are modified to decrease by a prescribed quantity $\Delta V_a$ or $\Delta V_b$ when a prescribed condition mentioned hereinafter has arisen, and by which the modification of speed is controlled depending on changes in condition. Controller 2 also includes reference speed calculation means 16 which calculates a reference speed $V_r$ which rectilinearly decreases at the rate of $-1$ G from a level equal to the remainder of the substraction of a prescribed value $\Delta V$ from the wheel speed $V_w$. $V_r$ is calculated when the rate of the decrease in the wheel speed has reached a prescribed value of $-1$ G, for example. Finally, controller 2 has a control section 17 which performs control on the basis of the outputs from the means 12, 13, 14 and 16 to open or close the hold valve 5 and the decay valve 6 to increase, hold or decrease the brake hydraulic pressure in the wheel cylinder 11.

To control the brake hydraulic pressure in the method, the four wheels of the vehicle are provided with the control units independently of each other, and the speeds of the wheels are controlled as unit speeds in the control units to regulate the modulators 5 of the units.

Figure 2:
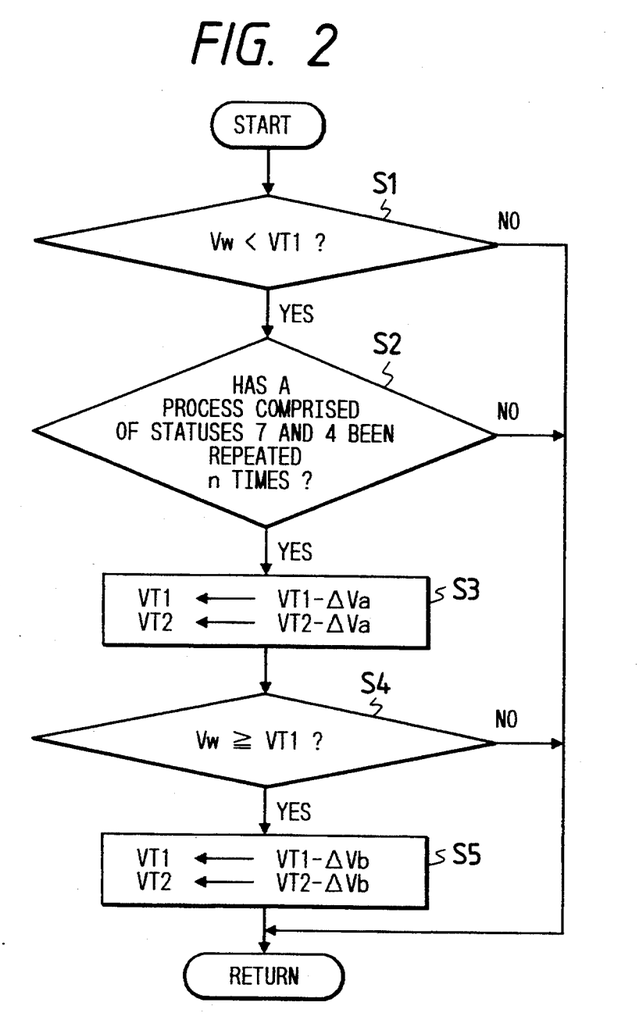
FIG. 2 is a flow chart of control in the method.

FIG. 2 is a flow chart of a routine of modifying the first and the second threshold speeds $VT_1$ and $VT_2$ by the threshold speed modification means 15. In the step 1 of the routine, the wheel speed $V_w$ and the first threshold speed $VT_1$ are compared with each other. If it is judged in the step S1 that the wheel speed $V_w$ has become lower than the first threshold speed $VT_1$, it is judged in the step S2 of the routine whether or not a process in which a status 7 begins and a status 4 begins at the termination of the status 7 and then terminates itself has been repeated n times. If it is judged in the step S2 that the process has been repeated n times, the step S3 of the routine is taken so that the prescribed speed differences of the first and the second threshold speeds $VT_1$ and $VT_2$ from the estimated vehicle speed $V_v$ are increased by the prescribed value $\Delta V_a$ from the initial values of the differences to change the threshold speeds into lower ones. In the step S4 of the routine, it is judged whether or not the wheel speed $V_w$ has become equal to or higher than the first threshold speed $VT_1$. If it is judged in the step S4 that the wheel speed $V_w$ has not yet become equal to or higher than the first threshold speed $VT_1$, the steps S1, S2 and S3 are taken again in that order. When it is judged in the step S2 that the process has been repeated n times again, the speed differences of the first and the second threshold speeds $VT_1$ and $VT_2$ from the estimated vehicle speed $V_v$ are further increased by the prescribed value $\Delta V_a$ to decrease the threshold speeds. When it is judged in the step S4 that the wheel speed $V_w$ has become equal to or higher than the first threshold speed $VT_1$, the step S5 of the routine is taken so that the speed differences of the first and the second threshold speeds $VT_1$ and $VT_2$ from the estimated vehicle speed $V_w$ are increased by the prescribed value $\Delta V_b$ to decrease the threshold speeds further.

Figure 3:
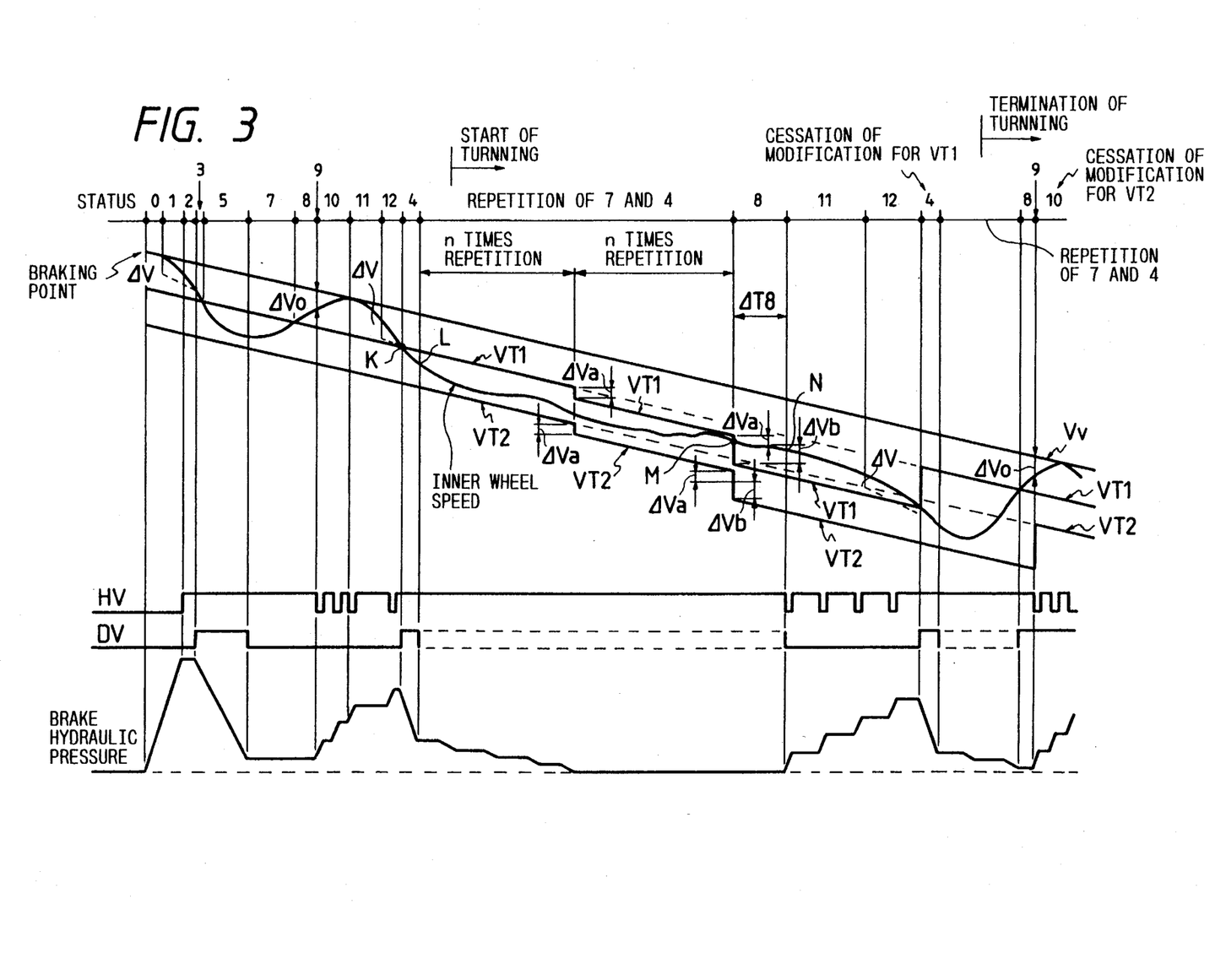
FIG. 3 is a time chart of the control.

FIG. 3 is a time chart indicating the relationship between the brake hydraulic pressure and the first and the second threshold speeds VT1 and VT2 in the case of the above-described modification thereof. In FIG. 3, the wheel speed Vw indicates the change in the speed of the inner wheel of the vehicle after the start of the turning thereof. At a time point K at which the wheel speed Vw decreases and becomes equal to the first threshold speed VT1, the status 4 which is a pressure decrease mode arises, and a decay timer is put in timing action. The status 4 terminates at a time point L at which the delay timer is put out of timing action after a prescribed time. Because the decay timer becomes put out of timing action, the status 7, which is a pressure hold mode, begins. If the wheel speed Vw does not become higher than the first threshold speed VT1 when the status 7 has been present for a prescribed time, the status is replaced by the status 4 so that the pressure of the braking liquid is decreased again.

When the vehicle is turned immediately after the time point L, the wheel speed Vw corresponding to the speed of the inner wheel of the vehicle tends to decrease so that the wheel speed does not become higher than the first threshold speed VT1. Therefore, it is very conceivable that the statuses 7 and 4 are repeatedly replaced by each other in that order after the time point L. For that reason, when the process in which the status 7 is replaced by the status 4 and the latter terminates, and this sequence has been repeated n times, which are a prescribed number of times, the prescribed speed differences of the first and the second threshold speeds VT1 and VT2 from the estimated vehicle speed Vv are increased by the prescribed value $\Delta Va$ from the initial values of the differences so that the threshold speeds are changed into lower speeds. If the wheel speed Vw does not become equal to or higher than the first threshold speed VT1 and the process is repeated n times after the change, the prescribed speed differences of the first and the second threshold speeds VT1 and VT2 from the estimated vehicle speed Vv are increased again by the prescribed value $\Delta Va$ from the present values of the differences so that the threshold speeds are changed into still lower speeds. This operation is repeated until the wheel speed Vw becomes equal to or higher than the first threshold speed VT1. In FIG. 3, as a result of modifying the threshold speeds repeatedly, the wheel speed Vw becomes equal to or higher than the first threshold speed VT1 at a time point M at which the second modification of the first and second threshold speeds VT1 and VT2 is performed. For that reason, a status 8, which is a pressure hold mode, begins at the time point M. However, in that case, the difference between the estimated vehicle speed Vv and the wheel speed Vw is so large that a condition which is for bringing about a status 9 (which corresponds to a pressure increase start time point) and is that the wheel speed Vw becomes higher than a speed $Vv - \Delta V_0$ which is lower by a prescribed value $\Delta Ve$ than the estimated vehicle speed Vv, does not arise. For that reason, a timer is put in timing action at the beginning of the status 8. If the wheel speed Vw does not become higher than the speed $Vv - \Delta V_0$ when the status 8 has been present for a prescribed time $\Delta T8$, the status is replaced by a status 11 so that a pressure increase (slow build-up) is started. However, if the wheel speed Vw is close to the modified first threshold speed VT1 though higher than the latter, at the beginning of the status 8, the wheel speed would be likely to become lower than the threshold speed VT1 to bring about the status 4. For that reason, at the time point M at which the wheel speed Vw becomes equal to or higher than the threshold speed VT1, the speed differences of the first and the second threshold speeds VT1 and VT2 from the estimated vehicle speed Vv are further increased by the prescribed value $\Delta Vb$ from the modified speed differences to decrease the threshold speeds further so as to prevent the wheel speed Vw from becoming lower than the first threshold speed, to cause the time of the start of the pressure increase to come quickly.

In the case of what is shown in FIG. 3, the wheel speed Vw does not become close to the estimated vehicle speed Vv but the status 8 lasts for the prescribed time $\Delta T8$ and is therefore replaced by the status 11 so that a pressure increase (slow build-up) is started at a time point N, and replaced by another pressure increase (slow build-up) in a status 12. Because of the pressure increase in the status 12, the wheel speed Vw is decreased to become lower than the first threshold speed VT1. The pressure decrease in the status 4 is then started. According to the present invention, the speed difference of the first threshold speed VT1 from the estimated vehicle speed Vv is changed back to the initial value of the difference at the time of the start of the pressure decrease in the status 4 so that the first threshold speed VT1 is increased. Because of the start of the pressure decrease, the wheel speed Vw increases toward the estimated vehicle speed Vv and becomes higher than the first threshold speed VT1 and close to the estimated vehicle speed so that the status 8 is replaced by a status 9 and a pressure increase (fast build-up) is then started in a status 10. The speed difference of the second threshold speed VT2 from the estimated vehicle speed Vv is changed back to the initial value of the difference at the time of the start of the pressure increase in the status 10.

Figure 4:
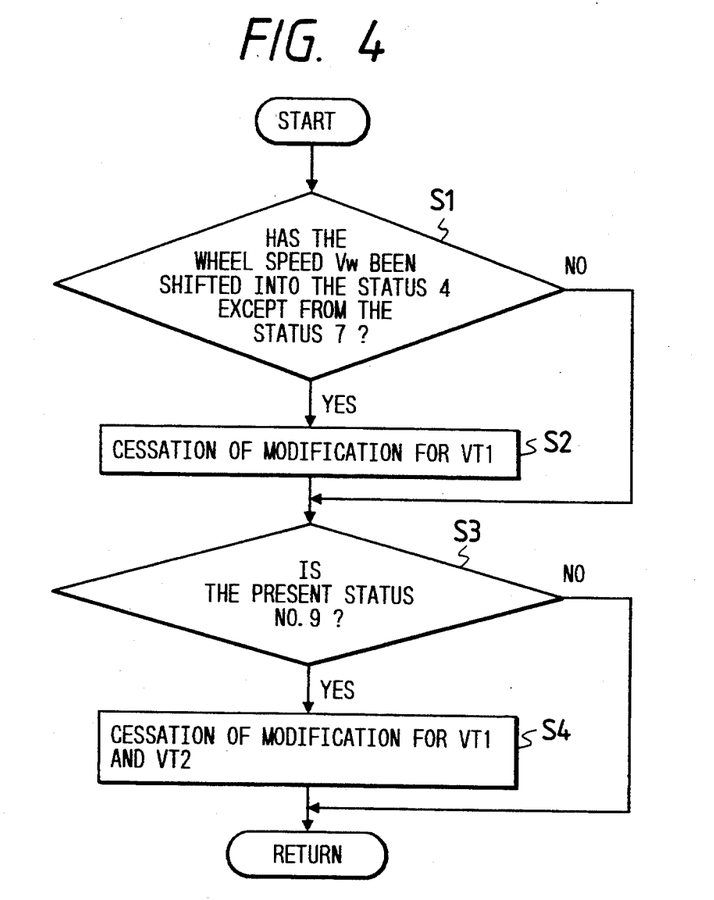
FIG. 4 is a flow chart of the control.

FIG. 4 is a flow chart of a routine of ceasing the modification of the first and the second threshold speeds VT1 and VT2. In the step S1 of the routine, it is judged whether or not the inner wheel speed Vw being a modified object is shifted into the status 4 as a pressure decrease mode except from the status 7, namely, the inner wheel speed has become lower than the first threshold speed VT1. If it is judged in the step S1 that the status 4 has begun, only the modification of the first threshold speed VT1 is ceased in the step S2 of the routine and the step S3 thereof is then taken. If it is judged in the step S1 that the status 4 has not yet begun, the step S3 is directly taken. If it is judged in the step S3 that the wheel speed Vw has risen to such a point as to start the pressure increase in the status 9, the step S4 of the routine is taken so that the modification of the second threshold speed VT2 is ceased. If the modification of the first threshold speed VT1 has not ceased at that time, the modification of the first threshold speed VT1 and that of the second threshold speed VT2 are both ceased in the step S4.

If not only the modification of the first threshold speed VT1 but also that of the second threshold speed VT2 were ceased in the step S2, the second threshold speed VT2 would rise, the wheel speed Vw would become lower than the second threshold speed and a status 6, which is a pressure decrease mode, would be brought about so that a pressure decrease would be continuously performed until the wheel speed becomes higher than the second threshold speed VT2, namely, the pressure decrease would become excessive. To prevent the pressure decrease from becoming excessive, only the modification of the first threshold speed VT1 is ceased in the step S2.

The embodiment which is the anti-lock control method is described above. In the method which is a four-channel anti-lock control method applied to the vehicle whose four wheels are controlled independently of each other in the method, the status 4 or 5 which is a pressure decrease mode is brought about when the wheel speed Vw in one of the control units has become lower than the first threshold speed VT1, so that the status 7 is brought about at the time of the termination of the status 4 or 5. If the vehicle is being turned in that case, the inner wheel speed Vw decreases while having a large difference from the estimated vehicle speed Vv. If the decrease with the difference continues, the statuses 7 and 4 are replaced by each other repeatedly and sequentially. When the mutual sequential replacement of the statuses 7 and 4 has been repeated n times, which is the prescribed number of times, the speed differences of the first and the second threshold speeds VT1 and VT2 (for the wheel speed Vw) from the estimated vehicle speed Vv are increased by the prescribed quantity $\Delta Va$ so that the threshold speeds are changed into lower speeds. This operation is repeated until the wheel speed Vw becomes equal to or greater than the threshold speed VT1. When the wheel speed Vw has become equal to or greater than the threshold speed VT1, the threshold speed VT1 and VT2 are further decreased by the prescribed quantity $\Delta Vb$. The brake hydraulic pressure for the wheel is thus increased enough.

When the wheel speed Vw has become lower than the first threshold speed VT1 modified, the modification of the threshold speed VT1 is ceased. If a condition for the modification has arisen after the cessation, the modification is started again. For that reason, it is possible to cope with the change in the radius of the turning of the vehicle.

Figure 5:
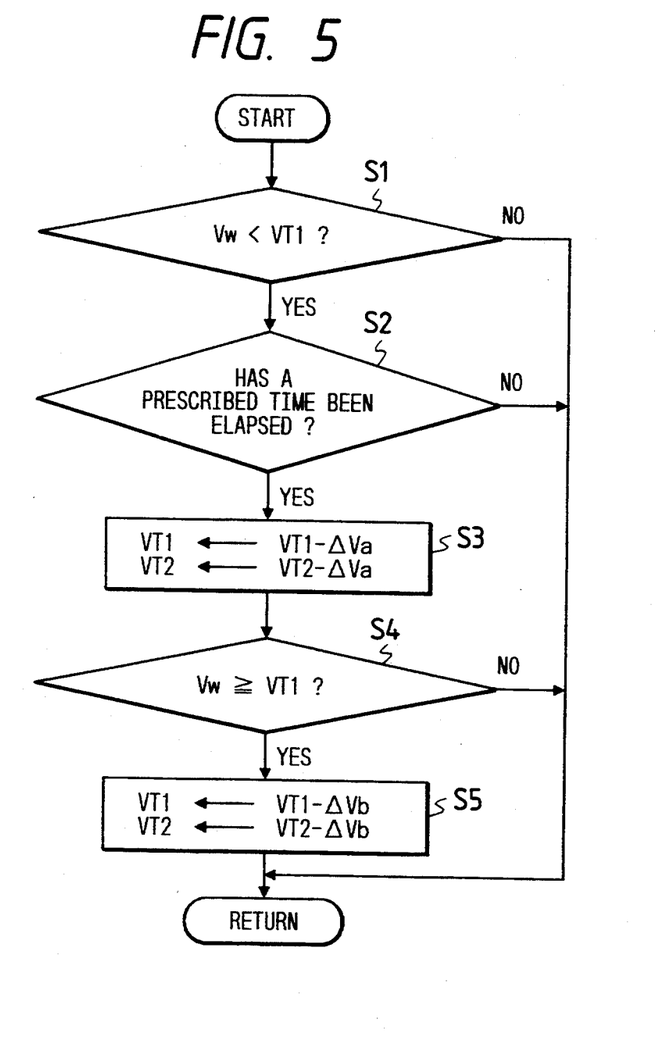
FIG. 5 is a flow chart of control in an anti-lock control method according to another embodiment of the present invention.

FIG. 5 shows a flow chart of a routine of modifying the first and second threshold speeds VT1 and VT2 by an anti-lock control method according to another embodiment of the present invention. Steps 1, 3, 4 and 5 are the same as those shown in FIG. 2 but it is judged in the step S2 that whether or not a wheel speed has been lower for a prescribed time than a threshold speed which follows an estimated vehicle speed with a prescribed speed difference therefrom. FIG. 6 is a time chart indicating the relationship between the brake hydraulic pressure and the first and the second threshold speeds VT1 and VT2 which are modified according to a flow chart shown in FIG. 5. In the method, as shown in FIG. 6, a first modification for the first and second threshold speeds VT1 and VT2 is performed at a time point at which the prescribed time has been elapsed from the time point K and a second or subsequent modification is performed at a time point at which the prescribed time has been elapsed since a time point at which a preceding modification has been performed.

According to the present invention, when one of the wheel speeds of a vehicle has been lower than a prescribed threshold speed for a prescribed time or has repeatedly entered into a prescribed state a prescribed number of times, the prescribed speed difference of the threshold speed from the estimated vehicle speed is changed from the initial value of the difference to a larger value only as to the one of the wheel speeds so that the wheel speed becomes higher than the threshold speed as the brake hydraulic pressure for the wheel is increased. Braking power can thus be maintained in the turning of the vehicle as well as in the straight movement thereof.

Since the speed difference is changed back to the initial value when the wheel speed has become lower than the threshold speed modified, it is possible to cope with the change in the radius of the turning of the vehicle.

What is claimed is:

1. An anti-lock control method for preventing locking of vehicle wheels when braking, said method comprising the steps of:

determining an individual wheel speed Vw for each of said vehicle wheels at the time of braking;

determining a highest individual wheel speed Vwh from among said individual vehicle wheel speeds;

estimating a vehicle speed Vv based on said highest individual wheel speed Vwh;

initially setting a first threshold speed VT1 based on said estimated vehicle speed Vv and an first predetermined speed difference, the first threshold speed being less than said vehicle speed Vv;

decreasing a brake fluid hydraulic pressure by establishing a decompression status period which begins when said individual wheel speed Vw becomes lower than said first threshold speed VT1; and decreasing said first threshold speed VT1 when said individual wheel speed Vw remains lower than said first threshold speed VT1 for a prescribed period of time, said decrease in said first threshold speed VT1 corresponding to an increase in said first predetermined speed difference.

2. The method according to claim 1, further comprising the steps of:

further decreasing said first threshold speed VT1 by further increasing said first predetermined speed difference by a variably assigned quantity $\Delta Vb$ when said individual wheel speed Vw becomes equal to or greater than said decreased first threshold speed VT1.

3. The method according to claim 2, further comprising the steps of:

returning said further decreased first threshold speed VT1 to said initial first threshold speed corresponding to said estimated vehicle speed Vv with an initial first predetermined speed difference when said individual wheel speed Vw becomes equal to or less than said further decreased first threshold speed VT1.

4. The method according to claim 1, wherein said decreasing step is repeated until said individual wheel speed Vw becomes equal to or greater than said decreased first threshold speed VT1.

5. The method according to claim 4, wherein said predetermined condition is defined whereby said wheel speed Vw has been less than said first threshold speed for a prescribed time from a second time point at which said modifying step is performed.

6. The method according to claim 4, wherein said predetermined condition is defined whereby said wheel speed Vw has repeatedly entered into a prescribed state a prescribed number of times after a second time point at which said modifying step is performed.

7. The method according to claim 4, further comprising the steps of:

further decreasing said first threshold speed VT1 by further increasing said first predetermined speed difference, by a prescribed quantity $\Delta Vb$, when said individual wheel speed Vw becomes equal to or greater than said decreased first threshold speed VT1.

8. The method according to claim 7, further comprising the steps of:

returning said further decreased first threshold speed VT1 to its initial value corresponding to said estimated vehicle speed Vv with an initial first predetermined speed difference when said individual wheel speed Vw becomes equal to or less than said further decreased first threshold speed.

9. The method according to claim 1, further comprising the steps of:

initially setting a second threshold speed VT2 based on said estimated vehicle speed Vv and a second predetermined speed difference so as to satisfy a relation $Vv > VT1 > VT2$; and decreasing said second threshold speed VT2 by further increasing said second predetermined speed difference by the variably assigned quantity $\Delta Va$ if said individual wheel speed Vw remains lower than said second threshold speed VT2 for a prescribed period of time or if said individual wheel speed Vw, while lower than said second threshold speed VT2, repeatedly enters into a prescribed state a predetermined number of times.

10. The method according to claim 9, further comprising the steps of:

further decreasing said first and second threshold speeds VT1 and VT2 by further increasing said first and second predetermined speed differences, by a prescribed quantity $\Delta Vb$, respectively, when said individual wheel speed Vw becomes equal to or greater than said decreased first threshold speed VT1.

11. The method according to claim 10, further comprising the steps of:

returning said further decreased first threshold speed VT1 to its initial value corresponding to said estimated vehicle speed Vv with an initial first predetermined speed difference when said individual wheel speed Vw becomes equal to or less than said further decreased first threshold speed.

12. The method according to claim 11, further comprising the steps of:

returning said further decreased second threshold speed VT2 to its initial value corresponding to said estimated vehicle speed Vv with an initial second predetermined speed difference when said individual wheel speed Vw becomes equal to or greater than a speed $Vv - \Delta V_0$ which is lower by a speed difference $\Delta V_0$ than said estimated vehicle speed Vv.

13. The method according to claim 1, wherein said wheel speed Vw is one of said wheel speeds and said step of decreasing said first threshold speed is performed only as to the one of said wheel speeds.

14. An anti-lock control apparatus for a vehicle, comprising:

means for sensing respective wheel speeds of wheels of said vehicle;

means for braking said vehicle wheels;

control means for controlling said braking means according to an output of said sensing means, said control means determining a vehicle speed based on a highest of said respective wheel speeds of said vehicle and for setting a threshold speed, said threshold speed corresponding to a difference between said vehicle speed Vv and a predetermined speed difference VT so as to satisfy $Vv > VT$, wherein brake hydraulic pressure of said braking means is decreased when said wheel speed is lower than said threshold speed; and means for decreasing said threshold speed by changing said predetermined speed difference from an initial value to a larger value when said wheel speed remains lower than said threshold speed for a prescribed time or repeatedly enters into a prescribed state a prescribed number of times.

15. The apparatus according to claim 14, further comprising:

means for ceasing modification of said threshold speed by changing said larger value back to said initial value when said wheel speed has become less than said threshold speed having said larger value.

16. A method of anti-lock brake control for a vehicle, comprising the steps of:

determining an individual wheel speed for each wheel of said vehicle;

calculating an estimated vehicle speed based upon a highest of said individual wheel speeds;

setting a threshold speed based on said estimated vehicle speed a first variably assigned reference speed difference;

decreasing brake hydraulic pressure to an individual wheel when the speed of said individual wheel is less than said threshold speed;

determining when said individual wheel speed has been less than said threshold speed for a variable reference time amount, and when said brake hydraulic pressure has repeatedly entered into a prescribed state a prescribed number of times; and setting a modified threshold speed according to a second variably reference speed difference which is greater than said first variably assigned reference speed difference.

* * * * *